US010785523B2

(12) United States Patent
Chakra et al.

(10) Patent No.: US 10,785,523 B2
(45) Date of Patent: Sep. 22, 2020

(54) STREAMING VIDEO QUEUE MANAGEMENT SYSTEM

(71) Applicant: INTERNATIONAL BUSINESS MACHINES CORPORATION, Armonk, NY (US)

(72) Inventors: Al Chakra, Durham, NC (US); Michael S. Thomason, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/184,001

(22) Filed: Jun. 16, 2016

(65) Prior Publication Data
US 2017/0366835 A1   Dec. 21, 2017

(51) Int. Cl.
H04N 21/214 (2011.01)
H04N 21/231 (2011.01)
H04N 21/24 (2011.01)
H04N 21/262 (2011.01)
H04N 21/44 (2011.01)
H04N 21/442 (2011.01)
H04N 21/647 (2011.01)
(Continued)

(52) U.S. Cl.
CPC ... *H04N 21/26258* (2013.01); *H04L 65/4084* (2013.01); *H04L 65/60* (2013.01); *H04L 67/18* (2013.01); *H04L 67/306* (2013.01); *H04L 67/42* (2013.01); *H04N 21/2402* (2013.01); *H04N 21/25841* (2013.01); *H04N 21/4331* (2013.01); *H04N 21/4532* (2013.01); *H04N 21/6125* (2013.01); *H04N 21/6131* (2013.01); *H04W 4/80* (2018.02)

(58) Field of Classification Search
None
See application file for complete search history.

(56) References Cited

U.S. PATENT DOCUMENTS 5,920,700 A * 7/1999 Gordon ............... G06F 3/0607
709/226
8,229,888 B1 * 7/2012 Roskind ........... H04N 21/25808
707/621
(Continued)

FOREIGN PATENT DOCUMENTS

EP      1267314 B1    12/2002

OTHER PUBLICATIONS

Volvo Cars "Volvo Cars and Ericsson developing intelligent media streaming for self-driving cars"; 2016; www.media.volvocars.com/global/en-gb/media/pressreleases/172080/volvo-cars-and-ericsson-developing-intelligent-media-streaming-for-self-driving-cars.

*Primary Examiner* — Brian T Pendleton
*Assistant Examiner* — Jean D Saint Cyr
(74) *Attorney, Agent, or Firm* — Cantor Colburn LLP; Teddi Maranzano

(57) ABSTRACT

Methods, systems and computer program products for managing a video streaming queue during a planned trip are provided. Aspects include receiving a list of content items from a user for viewing during the planned trip and receiving information regarding the planned trip. Aspects also include analyzing the content items to identify one or more properties of each of the content items in the list and determining a playback order for the content items in the list based on the one or more properties of each of the content items and the information regarding the planned trip.

20 Claims, 3 Drawing Sheets

(51) Int. Cl.
*H04L 29/08* (2006.01)
*H04L 29/06* (2006.01)
*H04N 21/61* (2011.01)
*H04N 21/45* (2011.01)
*H04W 4/80* (2018.01)
*H04N 21/433* (2011.01)
*H04N 21/258* (2011.01)

(56) References Cited

U.S. PATENT DOCUMENTS

| | | | | |
|---|---|---|---|---|
| 8,311,741 | B1* | 11/2012 | Lawther | H04W 4/02 |
| | | | | 701/527 |
| 9,109,918 | B2 | 8/2015 | Griesmer et al. | |
| 2012/0009890 | A1* | 1/2012 | Curcio | H04L 29/06 |
| | | | | 455/230 |
| 2012/0304043 | A1* | 11/2012 | Shahraray | H04L 67/18 |
| | | | | 715/202 |
| 2014/0278057 | A1* | 9/2014 | Berns | G08G 1/096883 |
| | | | | 701/410 |
| 2014/0298169 | A1* | 10/2014 | Williams | H04N 21/26258 |
| | | | | 715/716 |
| 2015/0281303 | A1* | 10/2015 | Yousef | H04N 21/643 |
| | | | | 709/219 |
| 2015/0312301 | A1* | 10/2015 | Dasher | H04L 65/4084 |
| | | | | 709/217 |
| 2015/0350746 | A1* | 12/2015 | Tomita | H04N 21/4325 |
| | | | | 725/34 |
| 2016/0044129 | A1* | 2/2016 | Bergmann | H04L 67/2847 |
| | | | | 455/406 |

* cited by examiner

STREAMING VIDEO QUEUE MANAGEMENT SYSTEM

BACKGROUND

The present invention generally relates to streaming video, and more particularly to a queue management system for streaming video during a planned trip.

During trips such as road trips, commutes, and the like individuals often watch videos to pass the time. Traditionally, individuals might have watched the videos on a portable DVD player or on an electronic device on which they had stored the video content on prior to the trip. However, with the advent of wireless broadband Internet network, the popularity of streaming video content during trips has increased. Streaming the video content allows individuals access to a vast amount of video content without requiring them to download and store the content that they would like to watch during the trip.

However, during trips, the quality and availability of a broadband Internet connection may vary significantly. As a result, individuals often experience disruptions in their viewing of the content items that are being streamed, this disruption is referred to as buffering and it can occur when the rate of the playback of a video exceeds a streaming rate for the video.

Therefore, heretofore unaddressed needs still exist in the art to address the aforementioned deficiencies and inadequacies.

SUMMARY

In accordance with an embodiment, a method for managing a video streaming queue during a planned trip is provided. The method includes receiving a list of content items from a user for viewing during the planned trip and receiving information regarding the planned trip. The method also includes analyzing the content items to identify one or more properties of each of the content items in the list and determining a playback order for the content items in the list based on the one or more properties of each of the content items and the information regarding the planned trip.

In accordance with another embodiment, a computer program product for managing a video streaming queue during a planned trip includes a non-transitory storage medium readable by a processing circuit and storing instructions for execution by the processing circuit for performing a method. The method includes receiving a list of content items from a user for viewing during the planned trip and receiving information regarding the planned trip. The method also includes analyzing the content items to identify one or more properties of each of the content items in the list and determining a playback order for the content items in the list based on the one or more properties of each of the content items and the information regarding the planned trip.

In a further embodiment of the invention, a processing system for managing a video streaming queue during a planned trip includes a processor configured to control a content displayed on a display screen. The processor is configured to receive a list of content items from a user for viewing during the planned trip and receive information regarding the planned trip, wherein the information regarding the planned trip includes at least one of a planned route, an estimated speed along the route, a date and time of the planned trip, and any planned stops. The processor is further configured to analyze the content items to identify one or more properties of each of the content items in the list, wherein the one or more properties of each of the content items include a playback time of the content item, a file format of the content item, a file size of the content item and a response time for a content repository that stores the content item and determine a playback order for the content items in the list based on the one or more properties of each of the content items and the information regarding the planned trip.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for managing a video streaming queue during a planned trip. In exemplary embodiments, a user of a user device provides a play list that includes a plurality of content items that the user would like to watch during a planned trip. In addition, the user may provide information for the planned trip such as the planned route, the average speed, the day/time of the trip, any planned stops or the like. In exemplary embodiments, a queue management system is configured to manage, prioritize, and play the content items on the user device during the planned trip. The queue management system is configured such that the user will not experience buffering, i.e., a disruption in video playback due to a need to download additional video content, (or at least keeping the buffering time to a minimum) while watching the content items during the planned trip.

Figure 1:
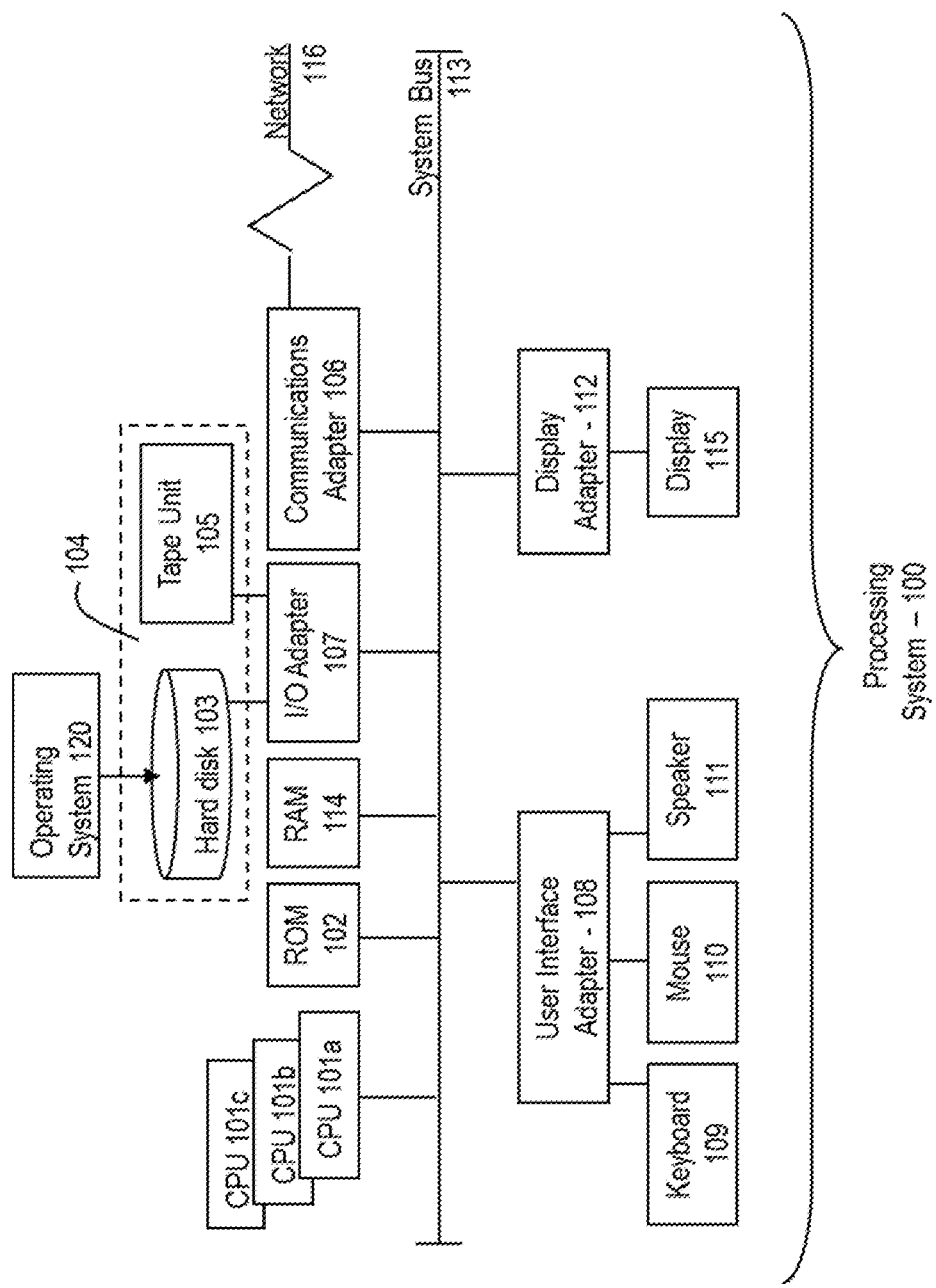
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
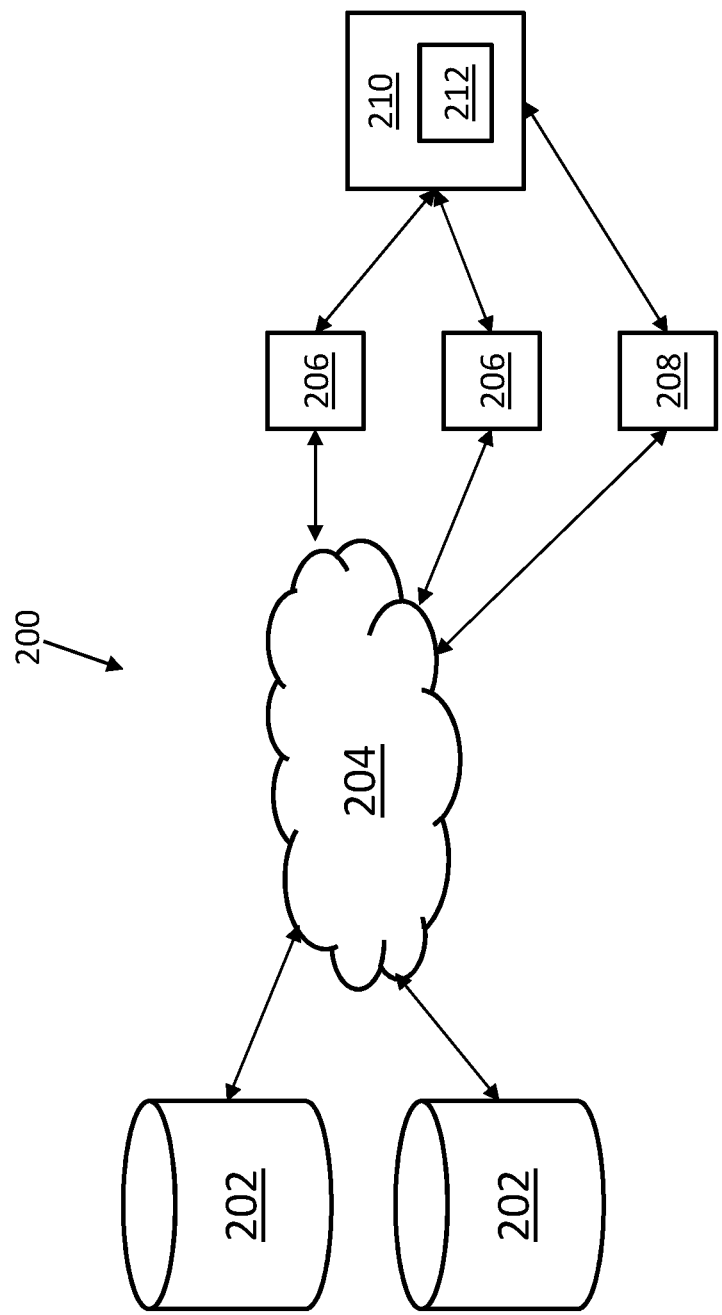
FIG. 2 is a block diagram illustrating a system for managing a video streaming queue during a planned trip in accordance with exemplary embodiments.

Referring now to FIG. 2, a system 200 for managing a video streaming queue during a planned trip in accordance with an embodiment is shown. As illustrated, the system 200 includes one or more content repositories 202 that are in communication with the Internet 204. In exemplary embodiments, the content repositories 202 are configured to store various types of content items, such as movies, television shows and the like, that are transmitted over the Internet 204 to user devices 210. The system 200 also includes one or more cellular communications systems 206 and may include other communications systems 208, such as Wifi communications systems. In exemplary embodiments, a user device 210 is configured to receive content from one or more content repositories 202 over the Internet and one or more of the cellular communications systems 206 and the other communications systems 208.

In one embodiment, the user device 210 may be a processing system similar to the one shown in FIG. 1. In other embodiments, the user device 210 may be a mobile computing device such as a tablet, a smartphone, a vehicle infotainment system or the like. In exemplary embodiments, the user device 210 includes a memory 212 that is used to temporarily store, or cache, video files received from the one or more content repositories 202. By temporarily storing the video files in the memory 212, the user device 210 is able to play the video without disruption of the video, i.e., pausing, to wait for the video file to be downloaded during playback. In exemplary embodiments, the user device 210 includes a queue management system that is configured to manage, prioritize, and play the content items on the user device during the planned trip. In exemplary embodiments, the system 200 may utilize an amount of available space in the memory 212 to determine a playback order for list of content items to be played during a planned trip.

Figure 3:
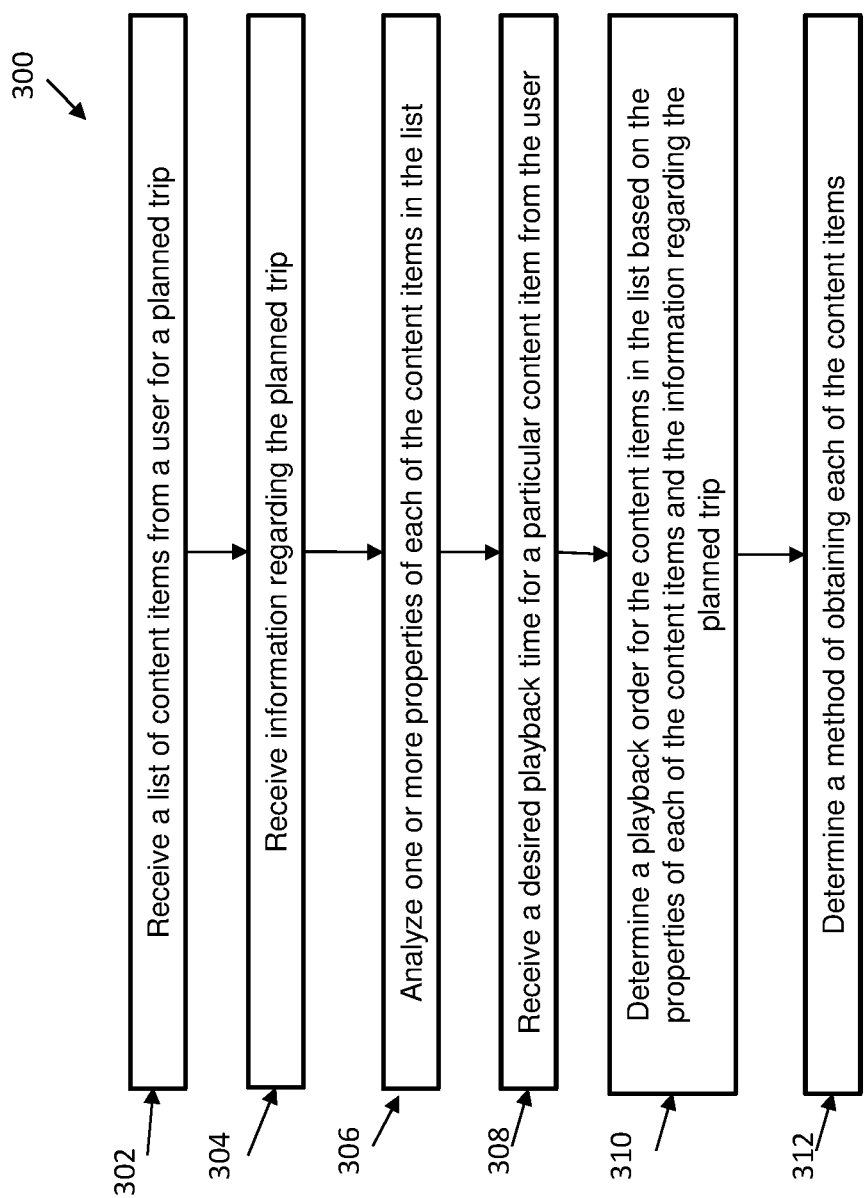
FIG. 3 shows a flow chart illustrating a method for managing a video streaming queue during a planned trip in accordance with an embodiment.

Referring now to FIG. 3, a method 300 for managing a video streaming queue during a planned trip is shown. As shown at block 302, the method 300 includes receiving a list of content items from a user for a planned trip. Next, as shown at block 304, the method 300 includes receiving information regarding the planned trip. In exemplary embodiments, the information regarding the planned trip can be received directly from a user and/or it may be received from route-planning software. The information for the planned trip may include a planned route, an estimated speed along the route, a date and time of the planned trip, and any planned stops or the like.

In exemplary embodiments, the method 300 also includes determining the availability of broadband Internet access along the planned route. The availability of broadband Internet access along the planned route may be based on the mobile communications networks that the user device is provisioned to access. For example, the user device may be configured to access a particular cellular communications systems and a set of private Wifi hotspots and may not be provisioned to access other cellular communications systems. In exemplary embodiments, determining the availability of broadband Internet access along the planned route includes receiving information regarding the availability of internet access between the towers through a plurality of inputs including but no limiting to published cell tower data by their respective companies, past experience, social networks.

Continuing with reference to FIG. 3, as shown at block 306, the method 300 also includes analyzing one or more properties of each of the content items in the list. In exemplary embodiments, the properties of the content items include a length of the content item, i.e., the playback time of the content item, the file format of the content item, the file size of the content item and a response time for the content repository that stores each content item. In exemplary embodiments, different content items may be stored in different content repositories, which have different response times.

In exemplary embodiments, the analysis of the content item includes determining an estimate of a stream speed required for playback of each content item. In exemplary embodiments, the estimated stream speed is a minimum data transfer rate that is needed to download the content item such that the playback of the item will not be disrupted. For example, if a content item is five minutes long and it has a file size of one hundred Megabytes (MB), the estimated stream speed would be 0.33 MB per second or twenty MB per minute.

In exemplary embodiments, the method 300 also includes receiving a desired playback time for a particular content item from the user, as shown at block 308. Next, as shown at block 310, the method includes determining a playback order for the content items in the list based on the properties of each of the content items and the information regarding the planned trip. In exemplary embodiments, the playback order is determined based on the availability and speed of internet access along the planned route and the amount of available memory available on the user device. In addition, the determined playback order can take into account the desired playback time provided for one or more content items. In exemplary embodiments, the playback of the content items can be automatically started when the planned trip begins.

In exemplary embodiments, the method 300 may also include determining a method of obtaining each of the content items, as shown at block 312. For example, the method 300 may determine to stream one content item from a cellular network during a first portion of a trip that is in a location with a robust cellular network and may determine to download a second content item from a Wifi hotspot at a planned stop along the trip or at a home location before the planned trip begins.

In one embodiment, a queue management system receives a list of content items that from a user that the user is interested in watching for a planned trip from Durham, N.C. to Washington D.C. The queue management system receives a planned departure time and a planned route for the trip from the user. The list of content items includes: a set of five high-definition music videos that lasts around five mins each; a high-definition movie with a runtime of ninety minutes; a kids television shown that is twenty minutes long; and a standard definition movie with a runtime of two hours.

The queue management system receives a preference of viewing the kids television shown at a particular hour, for example, 2:00 pm when the user's child wakes up from his nap. Next, the queue management system determines a playback order for the content items in the list based on the properties of each of the content items, the route information regarding the planned trip and the desired playback time received. For example, the queue management system may determine that the calculated streaming time for the kids television shown should be guaranteed to begin at roughly thirty minutes prior to 2 pm. In addition, based on the planned departure time, the queue management system can determine that there are three hours available for playback of other content items before starting the kids television show at 2:00 pm.

In exemplary embodiments, the queue management system may be configured to place content items that have a shorter runtime at the beginning of the playback queue to allow extra buffer time for the longer content items. Accordingly, in the above example, the music videos would be played first and then switched to a movie when the queue management system has downloaded enough of one of the movies to play it continuously without disruption.

In exemplary embodiments, the queue management system is configured to adjust the buffering time of the kids television shown show based on the estimate of the location of the vehicle at thirty minutes prior to 2 pm, which can change depending on the location and travel rate along the planned route. If the analysis shows that there will not be any signal available around that estimated location, the buffering of the timed show will start earlier, hence taking precedence over the other shows. In situations like this, the system would pick the standard-definition movie over the high-definition movie to be played first.

In exemplary embodiments, the queue management system disposed on the user device may have access to a user profile that can be used to automatically identify a list of content items that a user would like to watch during a reoccurring trip, such as a commute. For example, if a user of a user device routinely watches a specific type of content item during a reoccurring trip, the queue management system may be configured to automatically download similar content items in advance of a trip.

In one embodiment, a user may use their device to watch a daily news show on their way home from work but during a particular spot on their commute, the cellular network is not very strong and the user often experiences disruption of the video in this area. The queue management system is configured to recognize this area and to download and store a larger buffer of video data in advance of the user entering into this area to prevent the video playback from becoming disrupted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing a video streaming queue during a planned trip, the method comprising:
   receiving a list of content items from a user for viewing during the planned trip;
   receiving information regarding the planned trip, wherein the information regarding the planned trip includes a planned route;
   analyzing the content items to identify one or more properties of each of the content items in the list;
   determining an availability of broadband Internet access along the planned route;
   determining a playback order for the content items in the list based on the one or more properties of each of the content items, the information regarding the planned trip, and the availability of broadband Internet access along the planned route, wherein music videos are prioritized over movies in the playback order; and
   adjusting a buffer time of a first content item based on an estimated position of the user along the planned route in relation to a desired playback ending time of the first content item.

2. The method of claim 1, wherein the information regarding the planned trip further includes an estimated speed along the route, a date and time of the planned trip, and any planned stops.

3. The method of claim 2, wherein determining the availability of broadband Internet access along the planned route is performed by obtaining cellular tower information from one or more of a cellular network provider, a database of previously accessed cellular towers, and a social network.

4. The method of claim 2, further comprising determining a method of obtaining each of the content items based on the availability of broadband Internet access along the planned route.

5. The method of claim 1, further comprising receiving a desired playback time for a particular content item from the user and wherein the playback order for the content items in the list is further based on the desired playback time.

6. The method of claim 1, wherein the one or more properties of each of the content items include a playback time of the content item, a file format of the content item, a file size of the content item and a response time for a content repository that stores the content item.

7. The method of claim 1, wherein analyzing the content items includes determining an estimate of stream speed required for each content item based on the one or more properties of each of the content items.

8. The method of claim 3, further comprising automatically beginning the playback of the content items in the playback order on a user device when upon detection of a start of the planned trip.

9. The method of claim 8, further comprising tracking a progress along the planned route and updating the playback order based upon changes in the planned route and any changes to the planned stops.

10. A computer program product for managing a video streaming queue during a planned trip, the computer program product comprising:
    a non-transitory storage medium readable by a processing circuit and storing instructions for execution by the processing circuit for performing a method comprising:
    receiving a list of content items from a user for viewing during the planned trip;
    receiving information regarding the planned trip, wherein the information regarding the planned trip includes a planned route;
    analyzing the content items to identify one or more properties of each of the content items in the list;
    determining an availability of broadband Internet access along the planned route by obtaining cellular tower information from one or more of a cellular network provider, a database of previously accessed cellular towers, and a social network;
    determining a playback order for the content items in the list based on the one or more properties of each of the content items, the information regarding the planned trip, and the availability of broadband Internet access along the planned route, wherein music videos are prioritized over movies in the playback order; and adjusting a buffer time of a first content item based on an estimated position of the user along the planned route in relation to a desired playback ending time of the first content item.

11. The computer program product of claim 10, wherein the information regarding the planned trip further includes an estimated speed along the route, a date and time of the planned trip, and any planned stops.

12. The computer program product of claim 11, wherein determining the availability of broadband Internet access along the planned route is performed by obtaining cellular tower information from one or more of a cellular network provider, a database of previously accessed cellular towers, and a social network.

13. The computer program product of claim 10, wherein the method further comprises determining a method of obtaining each of the content items based on the availability of broadband Internet access along the planned route.

14. The computer program product of claim 10, wherein the method further comprises receiving a desired playback time for a particular content item from the user and wherein the playback order for the content items in the list is further based on the desired playback time.

15. The computer program product of claim 10, wherein the one or more properties of each of the content items include a playback time of the content item, a file format of the content item, a file size of the content item and a response time for a content repository that stores the content item.

16. The computer program product of claim 10, wherein analyzing the content items includes determining an estimate of stream speed required for each content item based on the one or more properties of each of the content items.

17. The computer program product of claim 12, wherein the method further comprises automatically beginning the playback of the content items in the playback order on a user device when upon detection of a start of the planned trip.

18. The computer program product of claim 17, wherein the method further comprises tracking a progress along the planned route and updating the playback order based upon changes in the planned route and any changes to the planned stops.

19. A processing system for managing a video streaming queue during a planned trip includes a processor configured to control a content displayed on a display screen, the processor configured to:
   receive a list of content items from a user for viewing during the planned trip;
   receive information regarding the planned trip, wherein the information regarding the planned trip includes at least one of a planned route, an estimated speed along the route, a date and time of the planned trip, and any planned stops;
   analyze the content items to identify one or more properties of each of the content items in the list, wherein the one or more properties of each of the content items include a playback time of the content item, a file format of the content item, a file size of the content item and a response time for a content repository that stores the content item;
   determine an availability of broadband Internet access along the planned route;
   determine a playback order for the content items in the list based on the one or more properties of each of the content items, the information regarding the planned trip, and the availability of broadband Internet access along the planned route, wherein music videos are prioritized over movies in the playback order; and
   adjusting a buffer time of a first content item based on an estimated position of the user along the planned route in relation to a desired playback ending time of the first content item.

20. The processing system of claim 19, wherein the processor is further configured to:
   determine a method of obtaining each of the content items based on the availability of broadband Internet access along the planned route; and
   analyze the content items includes determining an estimate of stream speed required for each content item based on the one or more properties of each of the content items.

* * * * *